G. W. RAY.
PRINTING FRAME.
APPLICATION FILED FEB. 21, 1910.
963,940.
Patented July 12, 1910.
2 SHEETS—SHEET 1.
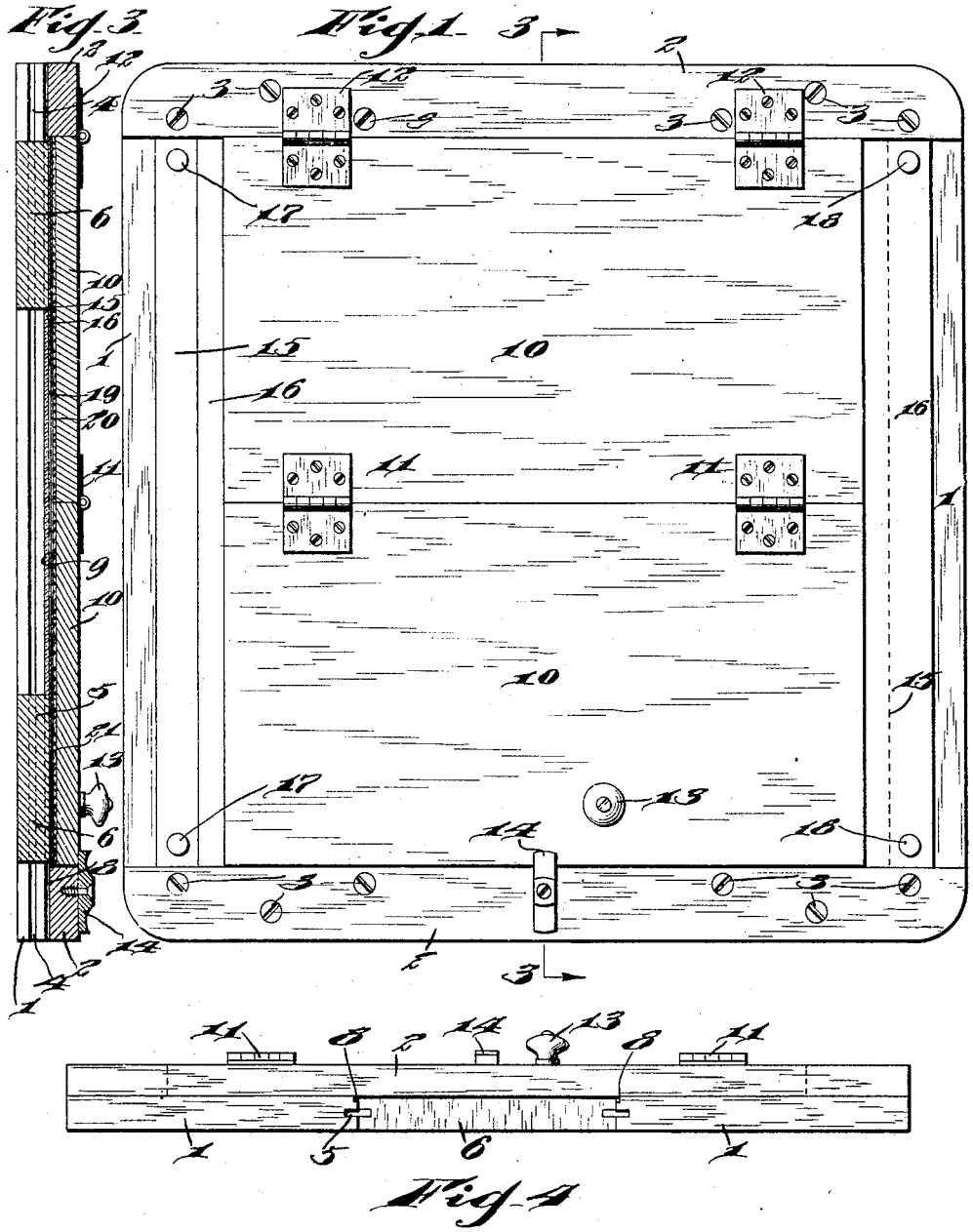
Witnesses
Theo. Reumann
R. H. Krenkel
Inventor
George W. Ray,
By Joshua R. H. Potts,
Attorney G. W. RAY.
PRINTING FRAME.
APPLICATION FILED FEB. 21, 1910.
963,940.
Patented July 12, 1910.
2 SHEETS—SHEET 2.
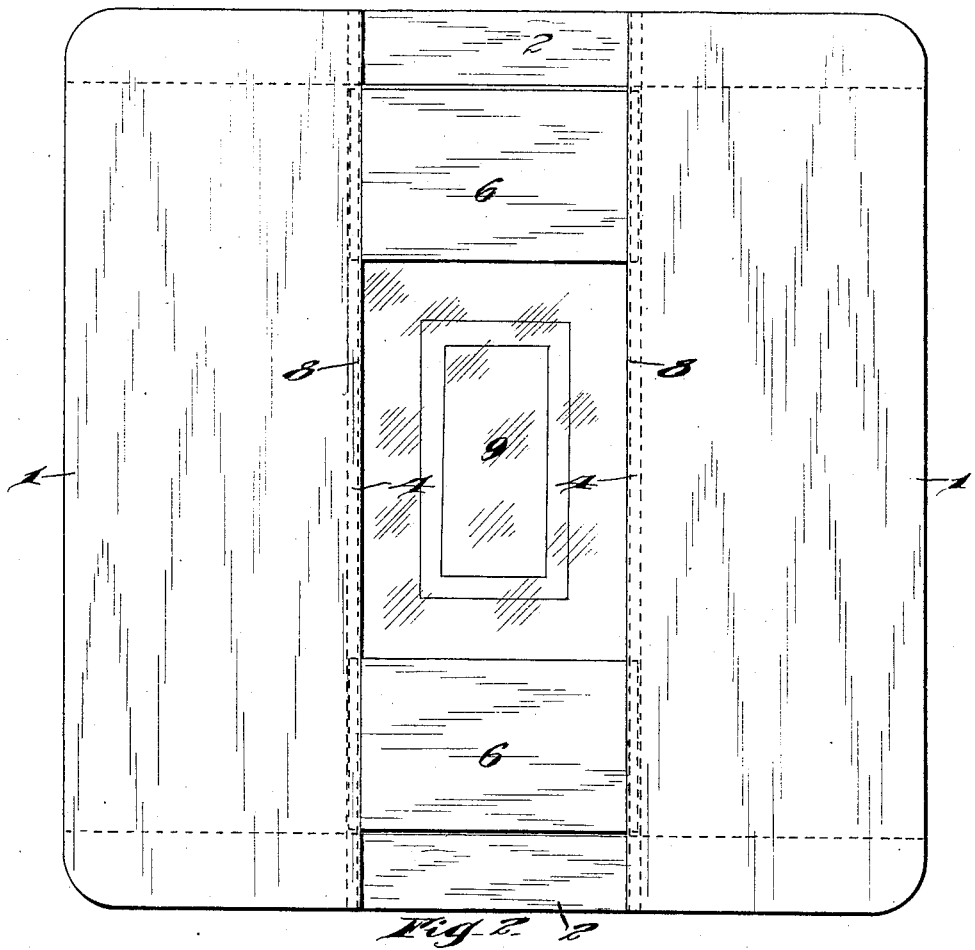
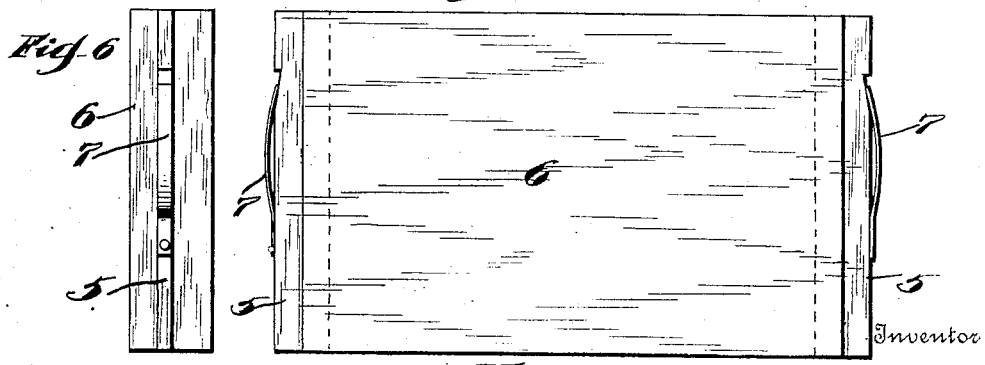
Witnesses
Thos. Rosemund
R. H. Krenkel
Inventor
George W. Ray,
By Joshua R. H. Potts,
Attorney

UNITED STATES PATENT OFFICE.

GEORGE WILLIAM RAY, OF PHILADELPHIA, PENNSYLVANIA.

PRINTING-FRAME.

963,940.  Specification of Letters Patent.  Patented July 12, 1910.

Application filed February 21, 1910. Serial No. 545,173.

*To all whom it may concern:*

Be it known that I, GEORGE WILLIAM RAY, a subject of the King of Great Britain, residing at Philadelphia, in the county of Philadelphia and State of Pennsylvania, have invented certain new and useful Improvements in Printing-Frames, of which the following is a specification.

My invention relates to improvements in printing frames, an object of the invention being to provide an improved frame of this character in which the back or cover is narrower than the frame proper, so as to leave exposed at both ends of the frame when the cover is closed, a portion of the frame to which opaque sheets may be secured containing openings of different sizes to facilitate the printing of photographs, having borders of a different shade or tint from the central portion of the picture, and which enables said printing to be absolutely uniform in all cases.

A further object is to provide a printing frame of this character with improved slides which enable the opening in the frame to be varied to suit various sizes of negatives, and securely hold the negative in position.

A further object is to provide an improved hinged back or cover for the printing frame, which enables the parts to be firmly held when the cover is partially closed, so that it may be definitely determined that the parts are in proper position, before finally clamping down the cover.

With these and other objects in view, the invention consists in certain novel features of construction, and combinations and arrangements of parts as will be more fully hereinafter described and pointed out in the claim.

In the accompanying drawings; Figure 1, is a view in elevation of the back of the printing frame. Fig. 2, is a similar view of the front of the printing frame. Fig. 3, is a view in section on the line 3, 3, of Fig. 1. Fig. 4, is an edge view of Fig. 1, and Figs. 5, and 6, are views in plan and end elevation of one of the slides removed.

The body of the frame is formed of two parallel bars or strips 1, 1, secured to cross bars 2, at their ends and located against their rear faces, the securing devices illustrated being screws 3, but I am in no wise limited to their use. The opposed edges of bars or strips 1, which are spaced apart as illustrated in Fig. 2, are provided with longitudinal grooves 4, to receive tongues or flanges 5, on the ends of slides 6. Springs 7, are secured to the edges of tongues 5, and exert a strong, frictional engagement against the inner walls of grooves 4, so as to hold the slide 6, wherever adjusted.

It will be noted that the opposed edges of bars 1, 1, at their rear faces are provided with longitudinal grooves 8, which serve to receive the negative or a clear glass, as shown at 9, and when the slides 6, are moved against the ends of the negative or glass, the latter will be firmly held in the opening.

10, represents the back or cover which comprises two sections connected by hinges 11, and the said cover is connected by hinges 12, with one of the bars 2. A knob or button 13, is provided on the cover to facilitate its manipulation and a turn button or other securing device is provided on bar 2, to securely hold the cover in closed position.

By reference particularly to Fig. 1, it will be seen that the back or cover 10, is appreciably narrower than the frame, thus exposing the bars 1, 1, at both edges of the back or cover. Between the back or cover 10, and the bars 1, two sheets 15, and 16, respectively are located, one above the other. The sheet 15, is held by thumb tacks 17, to bar 1, at one side of the cover, and the sheet 16, by thumb tacks 18, at the other side of the cover, so that when the cover is swung back, these sheets 15, and 16, may be swung back on their thumb tacks, and may be used singly or doubly between the back and the frame in printing. These sheets 15, and 16, are provided with openings 19, and 20, respectively, of different sizes so that they may be alternately utilized in connection with the negative and sensitive paper to print photographs, having borders of different shades or tints.

My improved frame is in no wise limited to any particular method of printing, but I consider myself at liberty to use the same in carrying out any method for which it is adapted.

One great advantage of my structure is that the negative or clear glass, and the sensitive paper with either of both of the sheets 15, and 16, may be assembled at the back of the printing frame, and the hinged cover moved downward so that its section between the hinges 11, and 12, will tightly clamp the parts in the frame, and when the operator is assured that everything is just as it should be, he swings down the free section of the back or cover, and secures it by the button 14.

The inner face of the back or cover sections are preferably lined with a thin covering of felt 21, or other soft material, and the frame may be made of wood or other suitable material best adapted to withstand the uses to which a device of this kind is to be put.

Various slight changes might be made in the general form and arrangement of parts described without departing from my invention and hence I do not limit myself to the precise details set forth, but consider myself at liberty to make such changes and alterations as fairly fall within the spirit and scope of the appended claim.

Having thus described my invention what I claim as new and desire to secure by Letters Patent is:

A printing frame, comprising a body, consisting of parallel bars or strips, and end bars on the strips secured to the rear faces of said first mentioned bars or strips, slides mounted to move between said first mentioned bars or strips, whereby various sized openings may be formed in the frame, and a back or cover comprising two sections hinged together, one section hinged to one of the end bars, a securing device on the other end bar, adapted to hold the back or cover in closed position, and said back or cover narrower than the body exposing the body at both side edges of the back or cover.

In testimony whereof I have signed my name to this specification in the presence of two subscribing witnesses.

GEORGE WILLIAM RAY.

Witnesses:
R. H. KRENKEL,
C. E. POTTS.